Feb. 6, 1951     E. J. WELLAUER     2,540,703
FLEXIBLE COUPLING
Filed March 2, 1948
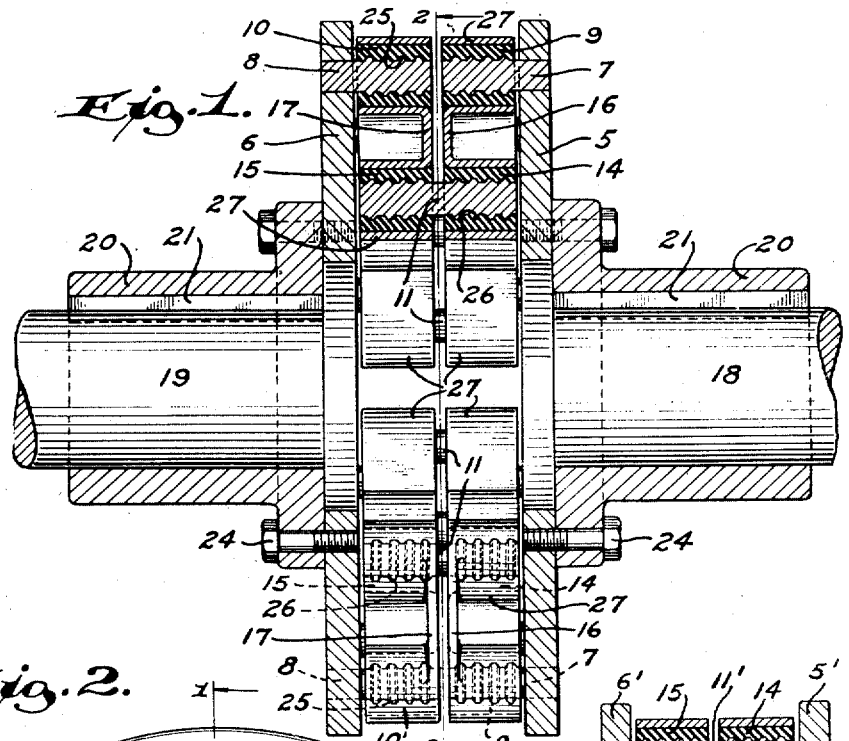
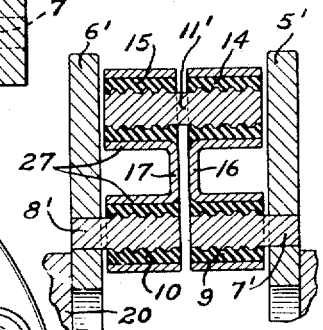
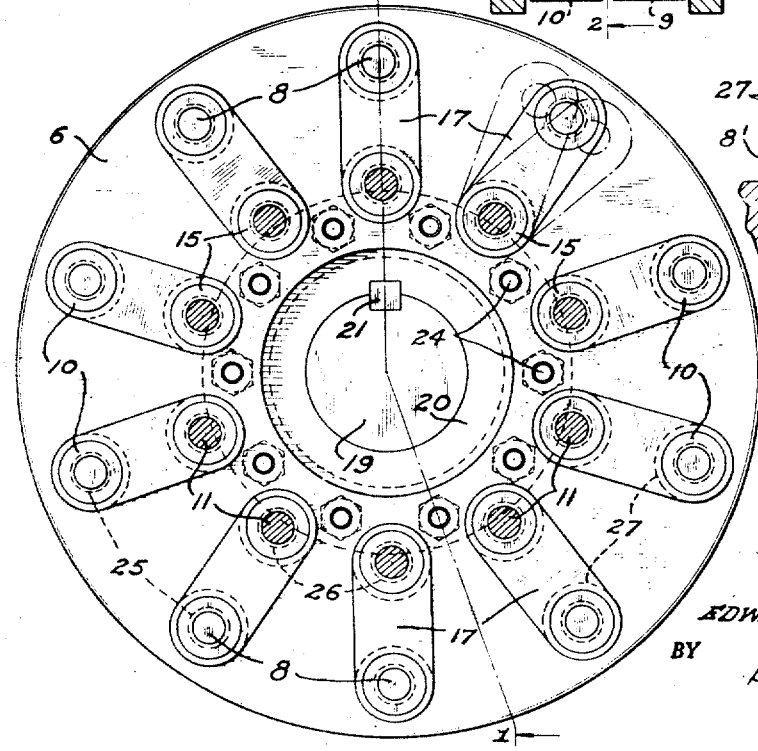
INVENTOR.
EDWARD J. WELLAUER
BY
ATTORNEY.

Patented Feb. 6, 1951

2,540,703

UNITED STATES PATENT OFFICE 2,540,703

FLEXIBLE COUPLING

Edward J. Wellauer, Wauwatosa, Wis., assignor to The Falk Corporation, Milwaukee, Wis., a corporation of Wisconsin Application March 2, 1948, Serial No. 12,601

11 Claims. (Cl. 64—12)

This invention relates generally to improvements in the art of transmitting power from rotary driving members to similarly rotatable driven members, and relates more particularly to improvements in the construction and operation of flexible shaft couplings of the deflectable bushing motion transmitting type.

Numerous different types of flexible couplings wherein rotary motion is transmitted from a driving member or shaft to a driven member or shaft through one or more rubber blocks or bushings, have heretofore been proposed and utilized for diverse purposes, but in most of these prior bushing type couplings, the rubber blocks were subjected primarily to direct compression only, and the available degree or extent of relative deflection as between the driving and driven members, was therefore rather limited. I have found that by taking advantage of the torsion or shear resisting characterstic of such flexible transmission bushings, in addition to the resiliency thereof under direct compression, the degree of flexing or deflection of such couplings may be materially and advantageously augmented or increased.

It is therefore a primary object of my present invention to provide an improved resi ient bushing type of flexible coupling wherein torque deflections are absorbed and compensated for by shear stressing as well as by merely compressing the flexible transmission elements.

Another object of the present invention is to provide an improved bushing type coupling having far greater range of flexibility and adapted to compensate for more extreme misalinement of the driving and driven members, than was permissible with prior coupling of this general type.

A further object of my invention is to provide a relatively simple, compact, and durable flexible shaft coupling assemb'age which is capable of safely absorbing extremely high torsional deflection induced by the driving or driven shafts, for long periods of time.

Still another object of this invention is to provide a coupling unit of the rubber bushing type, which possesses great axial and radial flexibility, and wherein the shear resisting characteristic of the bushings is advantageously utilized.

Another additional object of the invention is to provide an improved rotary shaft coupling which may be manufactured and maintained at moderate cost, and which is adapted for diverse uses and for the transmission of considerable power.

These and other more specific objects and advantages of my invention will be apparent from the fo'lowing detailed description and analysis.

A clear conception of the several improved features involved in this invention, and of the mode of constructing and of utilizing several embodiments thereof, may be had by referring to the drawing which accompanies and forms a part of this specification and wherein like reference characters designate the same or similar parts in the various views.

Fig. 1 is a longitudinal section through one type of my improved bushing coupling, the section having been taken along the line 1—1 of Fig. 2;

Fig. 2 is a transverse section through the flexible coupling of Fig. 1, taken along the line 2—2, and showing the approximate off-set positions of the deflectable links in dot-and-dash lines; and Fig. 3 is a fragmentary sectional view similar to that of Fig. 1, but illustrating a modified type of the improved coupling unit.

Although the present d'sclosure has been relatively confined to embodiments of the invention in multiple bushing types of shaft couplings, it is not my desire or intent to unnecessarily restrict the scope or utility of the improved features by virtue of this l'mited disclosure.

With reference to Figs. 1 and 2 of the drawing, the typical inwardly directed link and bushing coupling shown therein, comprises in general a pair of laterally separated or spaced approximately coaxial coupling disks 5, 6 having annular series of rigid projections or pins 7, 8 respectively extending toward each other and into the intervening space near the disk peripheries; outer resilient blocks or bushings 9, 10 snugly embracing and firmly attached to the respective pins 7, 8; an annular series of rigid elongated members or bars 11 disposed within the pin series and substantially spanning the space between the disks 5, 6; two laterally adjacent annular series of inner resilient blocks or bushings 14, 15 snugly embracing and firmly attached to the opposite end portions of the rods or bars 11; approximately radial links 16 connecting the inner bushings 14 with the outer bushings 9; other similar approximately radial links 17 connecting the inner bushings 15 with the outer bushings 10; and driving and driven rotary members such as shafts 18, 19 drivingly secured to the hubs 20 of the disks 5, 6 respectively as by keys 21 or the like.

As shown, the disks 5, 6 are flat and circular, and are firmly but detachably secured to their respective hubs 20 by means of cap screws 24; and the pins 7, 8 may be formed of metal and have their supporting ends press fitted within openings in their respective carrying disks 5, 6 while their overhanging ends are provided with a series of undulations or annular ridges 25 which are snugly embraced by the outer bushings 9, 10. The elongated members or bars 11 may likewise be formed of metal and have their opposite end portions provided with similar undulations or annular ridges 26; and the flexible bushings 14, 15 snugly embrace these ridges, as clearly shown in Fig. 1. All of the resilient bushings 9, 10, 14, 15 are preferably formed of rubber or the like and are vulcanized or otherwise firmly attached to the undulations 25, 26 of their respective carrying pins and bars; and the connecting links 16, 17 may be stamped from sheet metal and are provided with integral sockets 27 which snugly embrace the rubber bushings 9, 10, 14, 15 and to which these bushings may also be vulcanized. The annular rubber bushings 9, 10, 14, 15 should thus be fixed against rotation relative to their carrier pins and bars and relative to their connecting links 16, 17 so that any torsional deflection of the links 17 with respect to the pins 7, 8 and bars 11 will cause twisting or shear stresses to be applied to the intervening bushings.

Either of the shafts 18, 19 may be utilized as a driving member for transmitting rotary motion through the coupling assemblage, and these shafts may have their central axes somewhat misalined or off-set and may be subject to considerable torque variation. Assuming the shaft 18 to be the driver, when this shaft is rotated, the driving disk 5 will revolve the pins 7 and outer bushings 9 thus causing the links 16 to revolve the inner bushings 14, 15 and the bars 11. This revolution of the bars 11 is imparted through the inner bushings 15 to the links 17 and from these links to the pins 8 through the outer bushings 10, thus revolving the driven disk 6 and rotating the driven shaft 19. The load applied to the driven shaft 19 will normally produce more or less torsional deflection of the two sets of links 16, 17 from the radial solid line position to the dot-and-dash line positions shown in Fig. 2; and during such deflection, the inner and outer bushings 9, 10, 14, 15 will be subject to shear as well as compression, thus compensating for the torsional stress and tending to return the links 16, 17 to initial radial position without shock. The resiliency of the rubber bushings 9, 10, 14, 15 will also permit the links 16, 17 and the disks 5, 6 to tilt relative to each other, thus also compensating for misalinement of the driving and driven shaft axes, and the extent of deflection of these links as well as the magnitude of the torsional stress will naturally vary with variations in the power transmitting torque.

While the links 16, 17 of the coupling shown in Figs. 1 and 2 are radially disposed and inwardly directed with respect to the driving and driven members, these links may also be outwardly directed, and need not necessarily be accurately radially disposed but must be directed transversely of the shaft axes. As illustrated in Fig. 3, the spaced coupling disks 5', 6' are provided respectively with annular series of rigid pins 7', 8' projecting into the intervening space, and the series of rods or bars 11' surrounds the two pin series, so that the links 16, 17 are in fact directed approximately radially outwardly, instead of inwardly. This modified flexible coupling will function in a manner substantially similar to that of the embodiment shown in Figs. 1 and 2, except that the inner ends of the links 16, 17 will be spread apart under torsional deflection of the links, instead of the outer ends as in Fig. 2.

It is to be noted that in either of the embodiments shown, each set of the bushings 14, 15 may be formed as an integral unit, but by forming them separate, all of the bushings 9, 10, 14, 15 may be made of similar construction. All of the links 16, 17 may also be made of interchangeably similar construction with the aid of punches and dies; and the pins 7, 8 and disks 5, 6 as well as the hubs 20, may likewise be made interchangeable, thus reducing the cost of construction of the improved coupling units to a minimum especially when produced in quantity. Any desired number of connecting links 16, 17 and associated bushings 9, 10, 14, 15, pins 7, 8, and bars 11, may also be utilized in each coupling, depending upon its intended use and the power to be transmitted, thus adapting the improved assemblage for diverse uses.

The improved couplings besides providing great universal flexibility, most effectively compensate for extreme torsional deflection as between the driving and driven members; and by utilizing the shear resisting characteristics of the rubber bushings, extreme torsional deflection and stress will be quickly and effectively absorbed without objectionable shock. The resilient rubber bushings besides being capable of resisting high shear stress without destruction, have a desirable dampening effect which is very advantageous especially in cases where transmission shock must be eliminated. These bushings also transmit the load by both shear and compression and permit the couplings to be utilized with equal effectiveness when rotating in either direction, and the load being transmitted is distributed uniformly throughout the entire coupling assemblage. The various parts of the improved flexible couplings may obviously be readily assembled or dismantled and provide compact units which may be operated safely, and all of these parts are moreover readily accessible for inspection and require no special periodic attention such as lubrication since the torsional deflection is absorbed by the shear resisting characteristic of the various resilient bushings.

It should be understood that it is not desired to limit the present invention to the exact details of construction and to the precise mode of operation, herein shown and described, for various modifications within the scope of the appended claims may occur to persons skilled in the art; and it is moreover intended that specific descriptive terms employed herein, be given the broadest possible meaning and interpretation consistent with the disclosure.

I claim:

1. In a flexible coupling, spaced approximately alined driving and driven disks each having at least one rigid projection extending toward the other and each carrying a firmly attached flexible element, an elongated rigid member substantially spanning the space between said disks and carrying other firmly attached flexible elements, and a link connecting the flexible element of each of said projections with one of the flexible elements of said member, both of said links being normally disposed parallel to each other and approximately radially relative to the disk axes but being swingable about the axis of said member under torsional deflection induced by said disks.

2. In a flexible coupling, spaced approximately alined driving and driven disks each having an annular series of rigid pins projecting toward the other and each pin being embraced by a resilient bushing firmly attached thereto, an annular series of rigid bars substantially spanning the space between said disks and each bar being likewise embraced by resilient bushings firmly attached thereto, and links connecting the bushing of each of said pins with the adjacent bushing of one of said bars, said links being disposed approximately radially relative to the disk axes.

3. In a flexible coupling, spaced approximately alined driving and driven disks each having an annular series of rigid pins projecting toward the other and each pin being embraced by a resilient bushing firmly attached thereto, an annular series of rigid bars substantially spanning the space between said disks and each bar being likewise embraced by resilient bushings firmly attached thereto, and links connecting the bushing of each of said pins with the adjacent bushing of one of said bars, said links being disposed approximately radially relative to the disk axes and each set of said links which coacts with a common bar being swingable about its said bar under torsional deflection induced by relative angular displacement of said disks about their axes.

4. In a flexible coupling, spaced approximately coaxial driving and driven disks each having an annular series of rigid pins projecting toward the other and each pin being embraced by a firmly attached rubber bushing, an annular series of rigid bars substantially spanning the space between said disks and each bar being likewise embraced by firmly attached rubber bushings near its opposite ends, and two laterally adjacent annular series of radial links, the links of one of said series connecting the bushings at one end of said bars with the bushings carried by said driving disk pins and the links of the other series likewise connecting the bushings at the opposite end of said bars with the bushings carried by said driven disk pins.

5. In a flexible coupling, spaced approximately coaxial driving and driven disks each having an annular series of rigid pins projecting toward the other and each pin being embraced by a firmly attached rubber bushing, an annular series of rigid bars substantially spanning the space between said disks and each bar being likewise embraced by firmly attached rubber bushings near its opposite ends, and two laterally adjacent annular series of radial links, the links of one of said series connecting the bushings at one end of said bars with the bushings carried by said driving disk pins and the links of the other series likewise connecting the bushings at the opposite end of said bars with the bushings carried by said driven disk pins, and each of said links having opposite end sockets snugly confining the adjacent bushings.

6. In a flexible coupling, spaced driving and driven disks rotatable about approximately alined axes and each carrying an annular series of resilient bushings projecting toward the other, a coaxial annular series of other resilient bushings substantially spanning the space between said disks, and two laterally adjacent annular series of radial links interconnecting said disk supported bushings with said other bushing series.

7. In a flexible coupling, spaced driving and driven disks rotatable about approximately alined axes and each carrying an annular series of resilient bushings projecting toward the other, a coaxial annular series of other resilient bushings substantially spanning the space between said disks, and two laterally adjacent annular series of radial links interconnecting said disk supported bushings with said other bushing series, the opposite ends of each of said links being firmly secured to the adjacent bushings but being swingable about the bushing axes to subject the latter to shear.

8. In a flexible coupling the combination of driving and driven rotary coupling members, a plurality of substantially radial pairs of links, each link of a pair being connected adjacent one end to one of said members, and a torsionally resistant connection between each pair of links adjacent the other ends thereof to provide a flexible torque transmitting connection between said members.

9. In a flexible coupling, the combination of driving and driven rotary coupling members, a plurality of substantially radial pairs of links, each link of a pair being connected adjacent one end to one of said members, and a torsionally resilient connection between the links of each pair adjacent the other ends thereof.

10. In a flexible coupling the combination of driving and driven rotary coupling members, a plurality of substantially radial pairs of links, the links of each pair being connected to each other adjacent one end thereof, and a torsionally resilient connection between each of said members and a link of each pair adjacent the other end thereof.

11. In a flexible coupling the combination of driving and driven rotary coupling members, a plurality of substantially radial pairs of links, a torsionally resistant connection between the links of each pair, and a torsionally resistant connection between each of said members and a link of each pair, each of said connections including a radially confined block of resilient material and a stud having a portion imbedded in said block.

EDWARD J. WELLAUER.

REFERENCES CITED

The following references are of record in the file of this patent:

UNITED STATES PATENTS

| Number | Name | Date |
| --- | --- | --- |
| 268,807 | Landis | Dec. 12, 1882 |
| 1,654,312 | Trumpler | Dec. 27, 1927 |
| 1,894,507 | Ainsworth | Jan. 17, 1933 |
| 2,055,951 | Strandgren | Sept. 29, 1936 |
| 2,313,467 | Eilken | Mar. 9, 1943 |